United States Patent Office 3,424,035
Patented Jan. 28, 1969

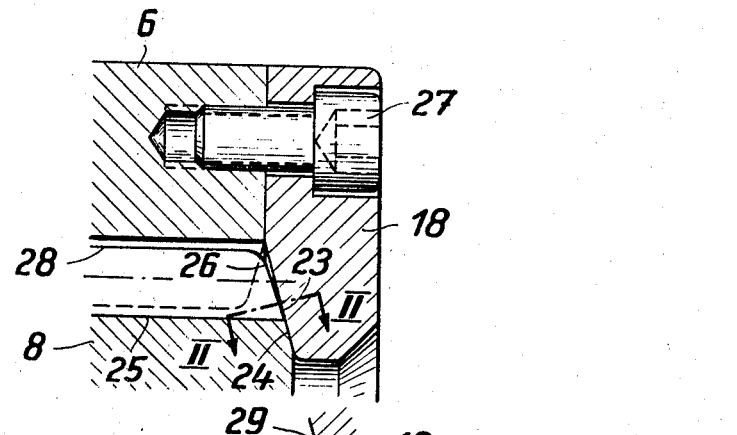
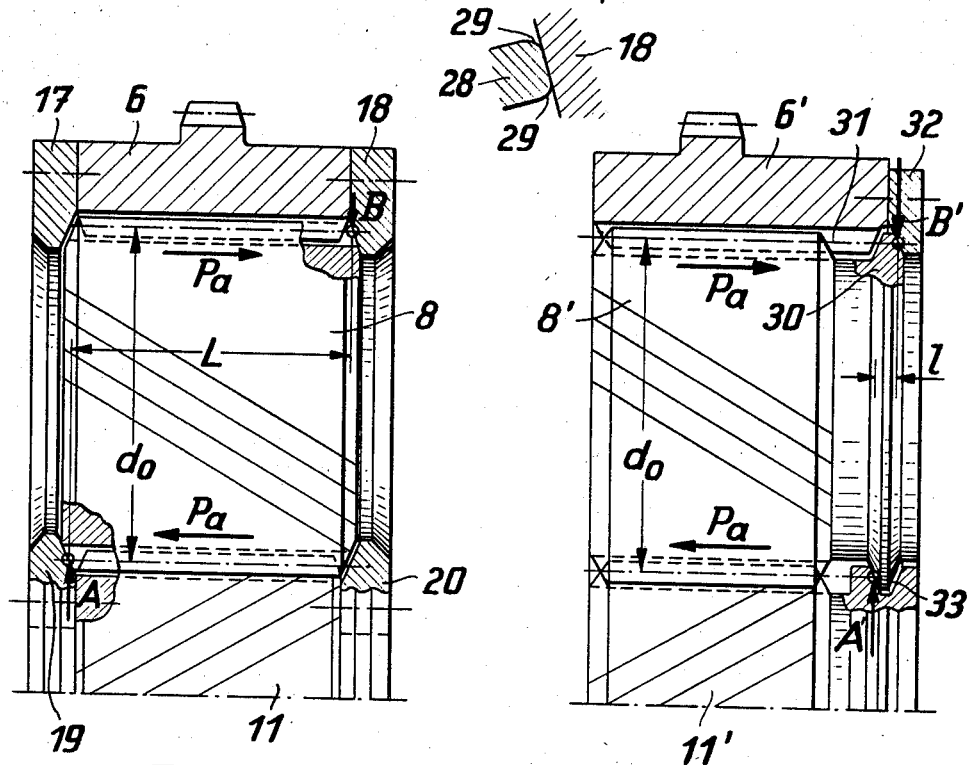

3,424,035
SPUR GEAR TYPE PLANETARY GEARINGS
Gunther Heidrich, Munich, Germany, assignor to Alexander W. Stoeckicht, Munich-Solln, Germany
Filed Dec. 30, 1966, Ser. No. 606,059
Claims priority, application Germany, June 11, 1966,
Z 12,265
U.S. Cl. 74—801                                          6 Claims
Int. Cl. F16h 1/28, 57/08

ABSTRACT OF THE DISCLOSURE

A planetary gearing unit which may utilize either straight or single helical spur gear planetary gearing wherein both the internal and external gears are self-adjusting with respect to their associated supporting members, and guiding pressure rings are mounted adjacent the ends of these gears for orienting axially positionable planetary gears, and as one of the internal or external gears is axially guided a self-alignment between the internal, planetary and external gearing is produced.

---

Figure 1:
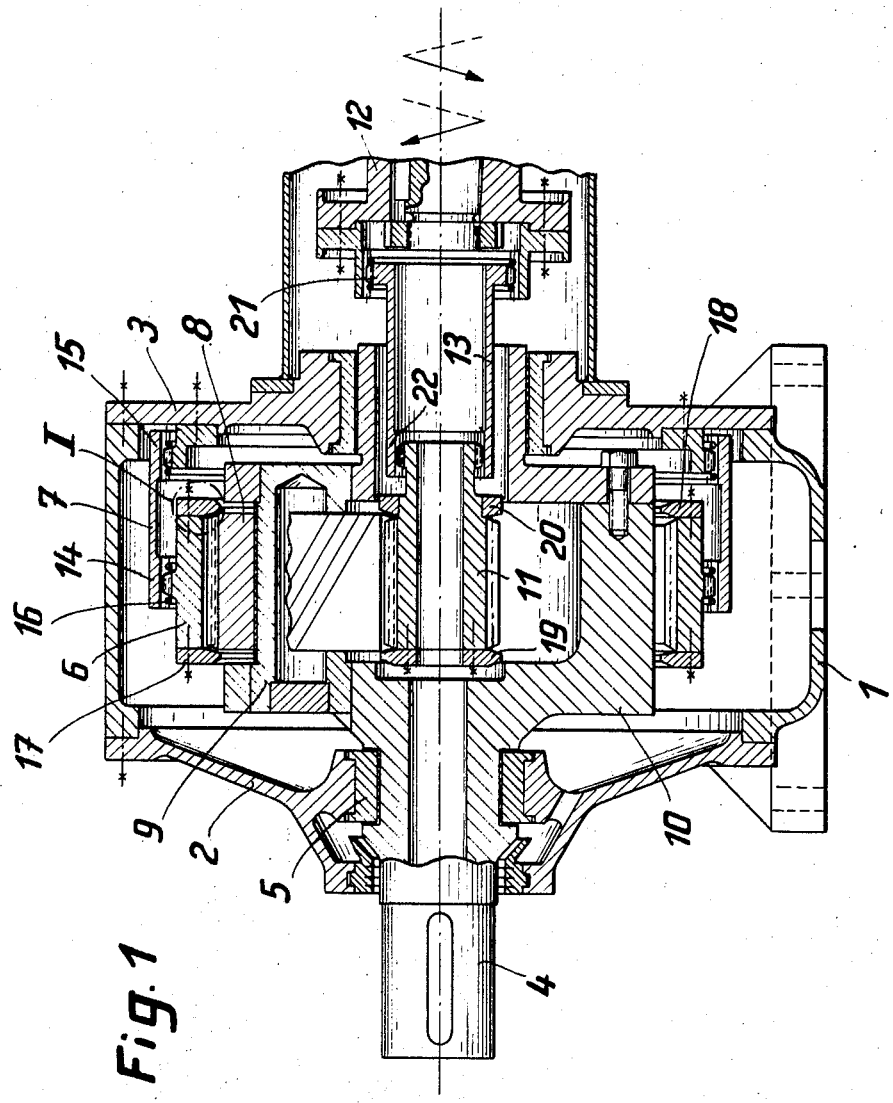

With herringbone spur gear type planetary gearings it is generally usual to axially fix only one gear, usually the outer center gear, while the axial position of the other gears is fixed by the tooth engagement. On principle, there is no such possibility with straight or single-helically toothed spur gear type planetary gearings, so that with such gearings one will always have to take in the bargain relatively increased bearing friction losses. With single-helically toothed spur gear type planetary gearings, in addition, tilting forces are resulting at each planet pinion which are caused by the axial component of the tooth forces. These tilting forces have a tendency of affecting the position of the axis of the planet pinion thus adversely affecting the tooth engagement. The lateral guide bearings of the planet pinions may prevent the occurrence of oblique positions of the axes of the planet pinion in higher degrees; minor effects within the limits of what is permitted by the bearing clearances, however, will remain inevitable and will impair the contact reflection of the planetary bearing and the tooth engagements.

To overcome these disadvantages, it has already been proposed with a straight or single-helically toothed spur gear type planetary gearing, in which both center gears are flexibly or elastically connected with the member accommodating their torque, to guide only one of the gears with respect to the member accommodating its torque, whereas the axial position of the other tooth gears is fixed by interengaging pressure rings rigidly connected with the gears.

These pressure rings are formed as toothings with an angle of skew of 90° and are arranged on the one side of the straight or single-helical toothing. It is possible in this manner, it is true, with a straight or single-helically toothed spur gear type planetary gearing, in a manner similar to a herringbone spur gear type planetary gearing, to axially fix only one gear for both directions of rotation and fix the other gears in their axial position only by tooth engagement, considering the tooth-like pressure rings to be a helical toothing with 90°. But these advantages are accompanied also by disadvantages, and the invention is concerned with the problem of providing a spur gear type planetary gearing overcoming these disadvantages without renouncing the above mentioned advantages.

These disadvantages of the known spur gear type planetary gearings utilizing pressure rings are resulting from the fact that the tooth-like pressure rings are arranged unilaterally on the gears of the planetary gearing. Both these pressure or spur rings proper and the space between the pressure or spur rings and the straight or helical toothing are lost to the power transmission. Besides, there will result a relatively long planet pinion and consequently a long planet pinion bearing bolt which has an unfavourable influence on the deflection properties of the bolt.

The circumferential forces engaging in the center of the tooth width, in addition, load the planet pinion bearing eccentrically which causes minor inclinations of the axis of the planet pinion within the limits of the bearing clearance. This fact has an unfavourable effect on the contact reflection of the bearing and the tooth engagements. The friction forces caused by the axial movements at the pressure or spur rings are able to transfer only about 3% of the gear power and practically are incapable of compensating for this disadvantageous inclination.

In accordance with the invention, the problem is solved in that the pressure rings are arranged directly at both toothing ends of each center gear and are bearing against the end faces of the planet pinion teeth and a non-interrupted annular area below the dedendum line thereof. One obtains in this manner, as compared with the known gearings a complete exploitation of the entire width of the planet pinion for power transmission so that the overall dimensions of the gearing is reduced or its power transmission is increased. The deflection of the planet pinion bearing bolt is likewise reduced because, on the one hand, reduced centrifugal forces are resulting due to the lower weight of the planet pinion and, on the other hand, the bearing bolt length subjected to bending is reduced. A reduced bearing bolt deflection results in improved safety in operation of the planet pinion bearing.

Furthermore, the tilting moment caused by the axial forces and acting at the planet pinions, is accommodated by far more favourably which results, in particular, into a reduction of the forces counteracting the tilting moment.

The planet pinion and the bearing thereof are also designed fully symmetrically, thus bringing about a resultant bearing force which, being effective exactly in the center of the planet pinion bearing, eliminates any inclination phenomenons.

Owing to the feature that the spur rings or pressure rings of the two center gears are lying close to the end faces of the planet pinion teeth and consequently the lubricating oil from the tooth engagement lubrication may arrive directly at the spur ring contact surface through the tooth gaps of the planet pinion teeth, favourable lubrication relationships result.

These relationships may be further improved by rounding-off the edges of the end faces of the planet pinion teeth.

In a preferable embodiment of the invention, the pressure rings are formed as specially detachable workpieces fastened to the center gears or the shafts thereof.

In this manner, there will be achieved a spur gear type planetary gearing which may be made at low cost and in a most simple manner.

Further improvements and suitable developments of the invention will be described by way of the attached drawing.

In the drawing:

FIG. 1 is a schematic representation of a longitudinal sectional view of a spur gear type planetary gearing in accordance with the invention, FIG. 2 is an enlarged partial sectional view taken on line I of FIG. 1, the sectional line II—II extending through a tooth of the planet pinion, FIG. 3 is an enlarged partially sectional view of a planet pinion axially supported in accordance with the invention, including the center gears meshing therewith, FIG. 4 is a partially sectional view similar to FIG. 3 of a planet pinion axially supported in the known manner.

In the example of the embodiment, all the members of the gearing are arranged in a housing 1 which is closed by the two lids 2 and 3, A slowly rotating shaft 4 is radially and axially guided in a bearing 5 of the housing lid 2.

The outer center gear of the planetary gearing is designated with 6 and is connected with the member accommodating its torque, in this case, thus, with the housing lid 3, via a double gear coupling 7. The outer center gear 6 meshes with a plurality of planet pinions 8, loosely rotatably supported on planet pinion bearing bolts 9. These planet pinion bearing bolts 9 are fastened in a planet carrier 10 rigidly connected with the slowly rotating shaft 4. The planet pinions 8 are in turn in mesh with an inner center gear or sun gear 11 which is not supported radially and is connected with the member accommodating its torque, in the present case the overspeed shaft 12, via a double gear coupling 13 equipped with straight toothing.

All the gears 6, 8 and 11 are formed with an angle of tooth, of, for instance, 30° as is usual with single-helically toothed spur gear type planetary gearings. Both halves 14, 15 of the double gear coupling are designed in such a manner that they allow for angular deflections and at the same time for slight axial displacement. For this purpose, a toothing for the gear coupling, for instance, is to be formed with a slight play. Instead of this play, it is also possible to provide for a bevelled or crowned tooth shape. Furthermore, the teeth of the two gear couplings must be capable of performing an axial displacement in a minor extent. To limit the longitudinal movement of the teeth of the two gear couplings, abutment means are provided. In the example of embodiment, they consist in spring rings 16 which are inserted in corresponding circumferential grooves thus serving to fix the outer center gear in an axial direction.

Pressure rings 17, 18 are provided on both sides of the outer center gear 6, for instance, by means of screws 27, said pressure ring rollingly bearing against the oblique end faces 23 of the teeth 28 of the planet pinions 8 and a non-interrupted annular face 24, within the dedendum line 25. This annular face together with the tooth end face forms a conical surface which is preferably slightly recessed at the tooth head in the shape of a crown as shown at 26. In addition, the edges of the end faces 23 of the planet pinion teeth 28 are rounded off as shown at 29, in order to facilitate the formation of an oil film between the pressure or spur gear 17, 18 and the tooth end face.

Correspondingly designed pressure rings 19, 20 are provided on both sides of the inner center gear 11. All the pressure rings are formed as independent workpieces and are detachably connected with the center gears 6, 11. Screws are serving to detachably fasten the pressure rings 17, 18, 19 whereas the pressure ring 20 is directly shrunk-on to the center gear 11 directly adjacent its toothing. The double gear coupling 13 is designed similar to the double gear coupling 7, the only difference being that the right-hand side gear coupling half 21 is axially fixed while the left-hand side gear coupling half 22 allows for axial displacement of the coupling sleeve 13 relative to the inner center gear 11.

The drawing, if studied in connection with the specification, shows that only the outer center gear 6 is axially supported. The axial position of the planet pinion 8 is secured by the engagement of the pressure rings 17, 18 and axial position of the inner center gear results from the axial position of the planet pinions by the engagement of the pressure of spur rings 19, 20. These pressure rings do not impede a self-adjustment of all the gears in a radical direction under the influence of the respectively acting tooth forces.

FIG. 3 shows an enlarged partially sectional view of the planetary gearing shown in FIGS. 1–2; and serves to illustrate the tilting moment effective on the planet pinion.

FIG. 4 shows a similar partially sectional view of a known planetary gearing of the general type shown in Patent 3,011,365. In FIG. 4, the outer center gear is referenced 6', the planet pinion 8', and the inner center gear 11'. These intermeshing gears are also helically toothed. The planet pinion 8' is provided with a counter tooth 30, the flanks of which are on the one hand rollingly bearing against the conically bevelled edges of the teeth 31 of the outer center gear 6' and on the other hand against the conical surface of a pressure ring 32 connected with the outer center gear 6'.

The inner center gear or sun gear 11' is in turn provided with a tooth-shaped annular recess 33 with the counter tooth 30 correspondingly engaging therein. With respect to FIG. 3, the axial force $P_a$ effective on the planet pinion 8 with the pitch circle diameter $d_0$, generates a tilting moment of the value $$M = P_a \times d_0$$

The same tilting moment is also effective on the planet pinion 8', as illustrated in FIG. 4.

The radial supporting forces caused by this tilting moment are referenced A and B in FIG. 3, and A' and B' in FIG. 4. The axial distance of the two supporting forces A, B from each other, in FIG. 3, corresponds to the distance L, while the axial distance of the supporting forces A', B' of FIG. 4 corresponds to the distance L'.

The radial supporting forces generated by this tilting moment as regards the values thereof are inversely proportional to the distance of the supporting points on the spur or pressure rings. As with equal tilting moments M, the distance L of FIG. 3 is essentially greater than the distance L' of FIG. 4, the radial supporting forces of A and B of FIG. 3 are essentially smaller than the radial supporting forces A' and B' of FIG. 4, as will be seen from the following equation:

$$A = B = \frac{M}{M} < A' = B' = \frac{M}{L'}$$

The invention offers further advantages in connection with spur gear type planetary gearings having more than three planet pinions. A tooth pressure balance by self-adjustment, or self-centering, respectively, of one or both center gears of a spur-gear type planetary gearing, as a rule, is effective only for three planet pinions, because the position of the self-adjusting center gear is determined by three points. In order to obtain a tooth pressure balance also for more than three planet pinions, it is known to form the respective self-adjusting center gear in such a manner that the elastic deformation thereof which is bound to occur because of the tooth forces, is dimensioned to be such that said elastic deformation will be in a position to balance the inequalities caused by pitch or toothing errors, assembly errors, etc., and thus an approximately uniform bearing effect of the planet pinions is obtained.

If the inertia moment of the cross sectional area of the center gear is dimensioned to be such that the deformation thereof under load relative to the alteration of tooth clearance caused thereby, is greater than the errors to be balanced relative to the differences in tooth play, so this will result into a warrant for simultaneous bearing of all the planet pinions even if the number thereof exceeds three. This teaching preferably is to be carried into practice in that the cross sectional area of the self-adjusting center gear with reference to the gear center axis, is formed symmetrically. Compliance with this teaching will not be met with any difficulties in connection with a planetary gearing formed in accordance with the invention, because both center gears are formed symmetrically. With the unsymmetric design of the gears of the known planetary gearing of FIG. 4, a different deformation (for instance in cone shape) might occur over the tooth width because of the unilateral stiffening on the ring side of the gear. This disadvantage which might lead to an unequal distribution of the load over the tooth width, is eliminated with the subject matter of the invention. At any rate with an unsymmetrical design of the planetary gearing, it will be extremely difficult and complicated to arrive at a uniform deformation in particular of the outer center gear and thus at an automatic load balance even for more than three planet pinions.

The subject matter of the application may be employed with the same advantage for both directions of rotation. Even in those cases where the gearing is constantly driven only in one direction of rotation, this property of the subject matter of the application constitutes an advantage because in many cases (for instance in running down after stopping the driving engine) a change in the direction of thrust will occur (change of flanks) which practically is equal to the gearing running on in the opposite direction of rotation.

The gearing is suited for both planetary gearings with rotating planet pinions and stationary gearings and for one-stage as well as multistage constructions.

The invention provides a spur gear type planetary gearing of high power density and high operating safety. The gearing may be made at low constructional costs and therefore low manufacturing costs.

What I claim is:

1. A planetary gearing unit comprising, in combination, a support, first and second axially aligned shafts rotatably mounted relative to said support for rotation about a common axis, an outer center gear and an inner center gear each having tooth ends and concentrically related to said axis, first means mounting said outer center gear to said support preventing angular movement about said axis and permitting limited axial movement thereof, second means connecting said inner center gear to said second shaft preventing relative angular displacement thereto about said axis and permitting limited axial movement of said inner gear, means axially guiding at least one of said gears, a plurality of planetary gears rotatably mounted on said first shaft about axes substantially parallel to said common axis disposed between and meshing with said outer and inner center gears, means permitting axial displacement of said planetary gears relative to their associated axes, said planetary gears including teeth having end faces and a dedendum circle, and annular pressure rings mounted on said outer and inner center gears adjacent said tooth ends thereof engaging said planetary gears adjacent said end faces thereby producing a self-alignment between said center and planetary gears.

2. A planetary gearing unit as in claim 1 wherein said pressure rings engage said planetary gears at a radial location less than that of said dedendum circle.

3. A planetary gearing unit as in claim 2 wherein said pressure rings also engage said end faces of said planetary teeth.

4. A planetary gearing as in claim 3 wherein said planetary gear teeth include a generatrix and the generatrix of said end faces is a convex line slightly crowned.

5. A planetary gearing as in claim 1 wherein said pressure rings comprise individual rings affixed to said center gears.

6. In a planetary gearing as in claim 1, a conical surface defined on each of said planetary gears adjacent said end faces converging away from the associated gear and conical surfaces defined on said pressure rings substantially corresponding in configuration to and engaging said planetary gear conical surfaces.

References Cited

UNITED STATES PATENTS

| | | | |
|---|---|---|---|
| 3,021,731 | 2/1962 | Stoeckicht | 74—801 |
| 3,174,352 | 3/1965 | Jekat | 74—410 |
| 3,213,713 | 10/1965 | Sagara | 74—801 |

ARTHUR T. McKEON, *Primary Examiner.*

U.S. Cl. X.R.

74—410